United States Patent [19]
Kazmierczak et al.

[11] Patent Number: 5,615,264
[45] Date of Patent: Mar. 25, 1997

[54] ENCRYPTED DATA PACKAGE RECORD FOR USE IN REMOTE TRANSACTION METERED DATA SYSTEM

[75] Inventors: Gregory J. Kazmierczak, Plainsboro; John R. Michener, Neshanic Station; Kathryn M. Smith, Somerville, all of N.J.

[73] Assignee: Wave Systems Corp., New York, N.Y.

[21] Appl. No.: 488,494

[22] Filed: Jun. 8, 1995

[51] Int. Cl.$^6$ .................................. H04L 9/00; H04L 9/32
[52] U.S. Cl. ..................................... 380/4; 380/9; 380/21; 380/23; 380/25; 380/29; 380/49; 380/50
[58] Field of Search .............................. 380/4, 9, 21, 23, 380/25, 43, 49, 50, 28, 29, 24, 54

[56] References Cited

U.S. PATENT DOCUMENTS

| | | | |
|---|---|---|---|
| 3,956,615 | 5/1976 | Anderson et al. | 380/25 X |
| 4,186,871 | 2/1980 | Anderson et al. | 380/24 |
| 4,375,579 | 3/1983 | Davida et al. | 380/28 |
| 4,827,508 | 5/1989 | Shear | 380/4 |
| 4,977,594 | 12/1990 | Shear | 380/4 |
| 5,050,213 | 9/1991 | Shear | 380/25 |
| 5,065,429 | 11/1991 | Lang | 380/25 |
| 5,191,611 | 3/1993 | Lang | 380/25 |
| 5,392,351 | 2/1995 | Hasebe et al. | 380/4 |
| 5,410,598 | 4/1995 | Shear | 380/4 |
| 5,495,533 | 2/1996 | Linehan et al. | 380/21 |

Primary Examiner—Bernarr E. Gregory

[57] ABSTRACT

The disclosed system relates to metered use cryptographic systems, and particularly to a data package and system operation for effecting metered purchases of encrypted data from a local encrypted database. A local CD ROM encrypted database includes one or more data package records containing one or more message keys encrypted under a database key, and one or more data packages encrypted under said message keys. The user decrypts portions of the database, and the data used is metered locally and recorded as a stored data usage record. The local stored data usage record is reported by telephone modem or other telecommunications link from a remote user terminal, such as a host personal computer containing a remote cryptographic control unit, to a cryptographic operations center. A second embodiment of an encrypted database for use in accordance with the present invention includes a header containing a message key encrypted under said database key, one or more subunit message keys encrypted under said message key, and a subunit data package encrypted under each said subunit message key. The subunit message key is selected to save storage space. The present system further permits a remote transaction mode in which an on line purchase of data from the encrypted database is affected in real time. Flexible system mechanisms include controls over purchase price, start times and expiration times, permission to purchase data on line and off line, and a time window within which purchased data may be decrypted.

8 Claims, 15 Drawing Sheets

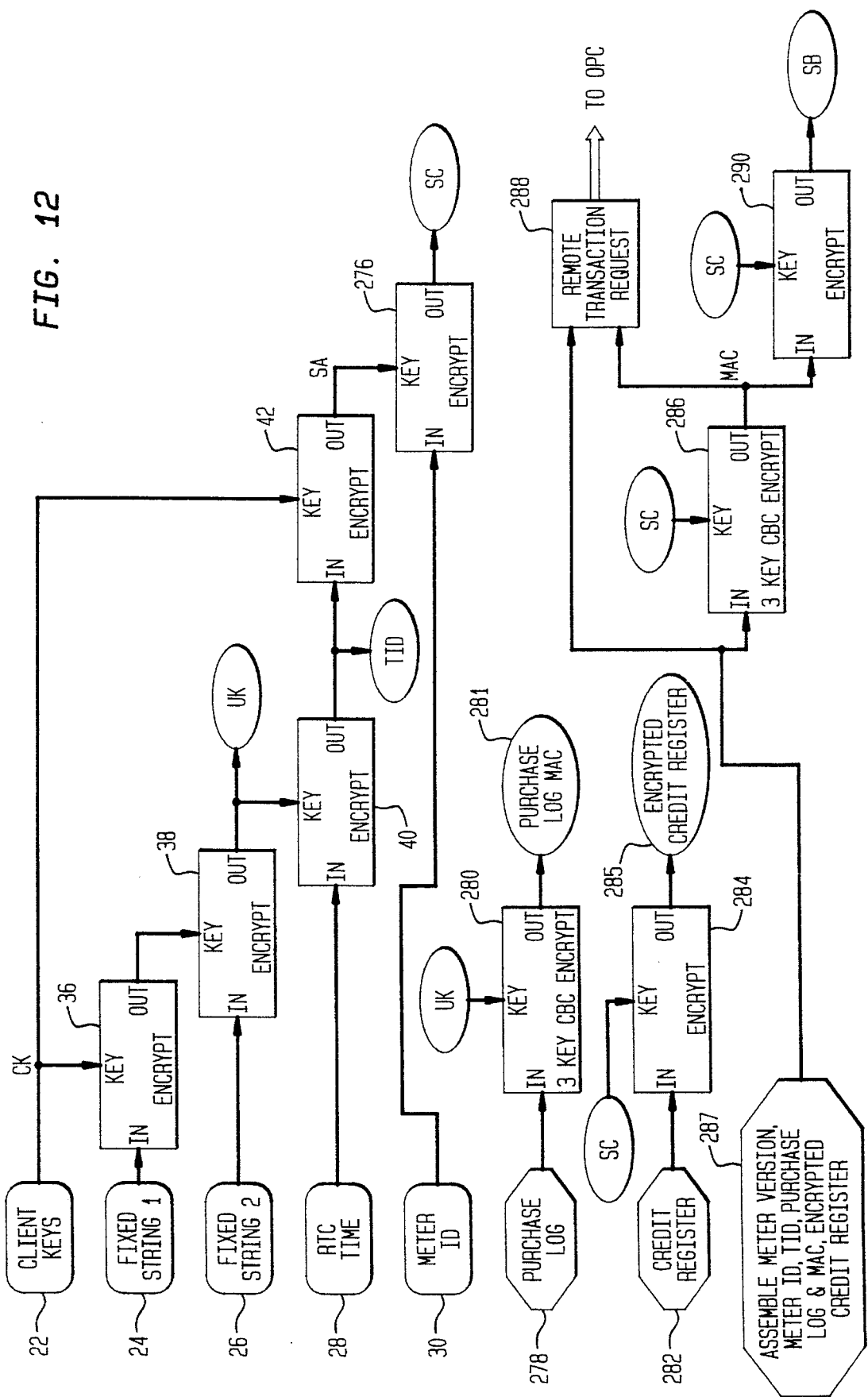

ENCRYPTED DATA PACKAGE RECORD FOR USE IN REMOTE TRANSACTION METERED DATA SYSTEM

FIELD OF THE INVENTION

The present invention relates to metered use cryptographic systems, and particularly to a data package record used in a method and apparatus for effecting purchases of the metered use of encrypted data. A co-pending application assigned to the same assignee as the present invention, entitled "SECURE COMMUNICATION SYSTEM WITH CROSS LINKED CRYPTOGRAPHIC CODES", U.S. application Ser. No. 08/488,624 is filed on Jun. 8, 1995.

BACKGROUND OF THE INVENTION

Systems for metering information use are known. For example, see U.S. Pat. No. 4,827,508 to Shear, or U.S. Pat. No 5,010,571 to Katznelson in which access to an encrypted CD ROM database is metered. Briefly, a CD ROM containing an encrypted database of interest to a user is distributed typically at nominal cost or at no cost. A user terminal includes a host computer, a CD ROM reader, and a remote cryptographic control unit which is provided with stored cryptographic keys needed to access the database. The amount of actual data use, i.e. the retrieval and decryption of data from the CD ROM, is metered locally and recorded as a stored data usage record. The charge for data access may be either in accordance with the amount of data decrypted, or in accordance with price information recorded in the respective data headers of each individual data package.

The local stored data usage record is reported (uploaded) by telephone modem or other telecommunications link from a remote user terminal, such as a host personal computer containing the remote cryptographic control unit, to a cryptographic operations center. Each remote cryptographic control unit has a secret stored key, unique to that remote user terminal. Communication between the user terminal and the cryptographic operations center is protected by encryption using the secret key, which is stored in a secure memory in the cryptographic control unit. The secret key for each user is also stored in the cryptographic operations center. When a remote user terminal calls in and identifies itself, the cryptographic operations center looks up the corresponding user secret key, which is then used in a secure subsequent communication data exchange between the remote user terminal and the cryptographic operations center.

Also stored in the cryptographic operations center are the various cryptographic keys corresponding to the available CD ROM database titles. The user secret key is also used to secure the delivery of secret database keys from the cryptographic operations center to the user terminal for a desired CD ROM database, usually upon first encountering a new CD ROM title.

As indicated, the remote cryptographic control unit reports data usage by telephone modem. After the data usage report is successfully uploaded to the cryptographic operations center, the user is then billed, charged or debited for the actual database usage, based on the content of the uploaded data usage report. Thus, rather than being required to purchase an entire CD ROM database, the user pays only for the amount of data actually used or decrypted from the CD ROM.

Typically, the remote cryptographic control unit in the user terminal contains one or more credit registers. As each data purchase is made and recorded as a purchase log, a debit is made from the appropriate credit register. The credit register limits the amount of data which may be decrypted before requiring downloaded credit from the cryptographic operations center. The purpose of the credit register is to prevent unlimited access to the database without reporting the purchase logs and paying for data usage, and limited off line access to credit. If the available credit is exhausted, no further data decryption is allowed until new credit is downloaded to the user terminal. Past data usage is reported by the user terminal to the cryptographic operations center in a usage report consisting of multiple purchase logs (stored data usage records).

However, prior art systems have several operational problems solved by the data package record and system operation of the present invention.

In the prior art, a separate encryption code is typically used for each separate data package. In such manner, a separate charge may be made for each data package. While one header per data package is adequate when the data package is large relative to the encryption key, such system becomes inefficient when the data package is smaller. In such case, the encryption keys could use more memory than the data. For example, in a database such as a mailing list, the records are too small to justify a separate encryption key for each entry, yet it is desired to charge separately and encrypt separately, for each data record in the mailing list.

Also, in prior art systems, running out of credit terminates the data decryption session and forces the user to establish communication with the cryptographic operations center to download further credit. Thus, exhausting the credit registers in the middle of a data session will abort the session.

Further, in prior art systems, information publishers had no direct control over who purchased their data, since a purchase could be made locally off line merely by having sufficient credit available at the local user terminal.

SUMMARY OF THE INVENTION

The present invention is embodied in a data package record for use in an encrypted data system including on line remote transaction capability between a user terminal containing a remote cryptographic control unit (CRYPTO unit) and a cryptographic operations center (OPC).

In particular, a first embodiment of an encrypted database for use in accordance with the present invention includes a header containing a message key encrypted under a database key, and a data package encrypted under said message key. Another embodiment of an encrypted database for use in accordance with the present invention includes a header containing a message key encrypted under said database key, a subunit message key encrypted under said message key, and a subunit data package encrypted under said subunit message key. In yet another embodiment, the subunit message key is truncated to save memory space. In a further embodiment, the subunit message key is derived from the data address by masking the virtual data address to match the length of the desired subunit message key. In the latter embodiment, no additional memory space is needed to store subunit message keys.

During the process (referred to herein as DP setup) to derive encryption keys and decrypt the desired data from the encrypted database, the CRYPTO unit checks whether sufficient credit and/or sufficient database keys are present to complete the purchase transaction. If credit is missing, a remote transaction mode may be used if the user chooses to initiate the remote transaction mode, and, if the database permits a remote transaction. For a remote transaction, the CRYPTO unit initiates an immediate report to the OPC, in a remote transaction operation.

In making a purchase during a remote transaction, no credit or refund is downloaded and no entry of the current purchase is made as a purchase log. Instead, an online purchase of the data package is effected in real time which permits continuation of the user's data session. Thus, remote transaction mode combines the use of an encrypted off line database, and a real time on line financial transaction, to purchase off line encrypted data.

Remote transaction mode also permits greater control by an information publisher over the distribution of its product. The software publisher may require that all purchases be made by remote transaction mode, by setting a purchase permission field in a control record called a DB info record. By requiring on line purchases (as opposed to purchases made off line and later reported), the information publisher knows the identity of the purchaser before the purchase, and thus may restrict product sales to certain users.

The remote transaction data exchange is made as short as possible in order to complete the transaction and permit the user to resume database use as soon as possible. In a remote transaction the CRYPTO unit generates a message which combines a secure header, a report of a single purchase log and a credit request record, all in one message. The OPC responds by downloading an encrypted version of the desired database key encrypted under a key unique to the remote transaction to approve credit, which acts as a double check on the proper delivery of database keys.

BRIEF DESCRIPTION OF THE DRAWINGS

FIG. 12 is a flow chart diagram illustrating a method and apparatus for generating a remote transaction request in a remote CRYPTO unit in accordance with the present invention.

DETAILED DESCRIPTION

A Metered Data System

Figure 1:
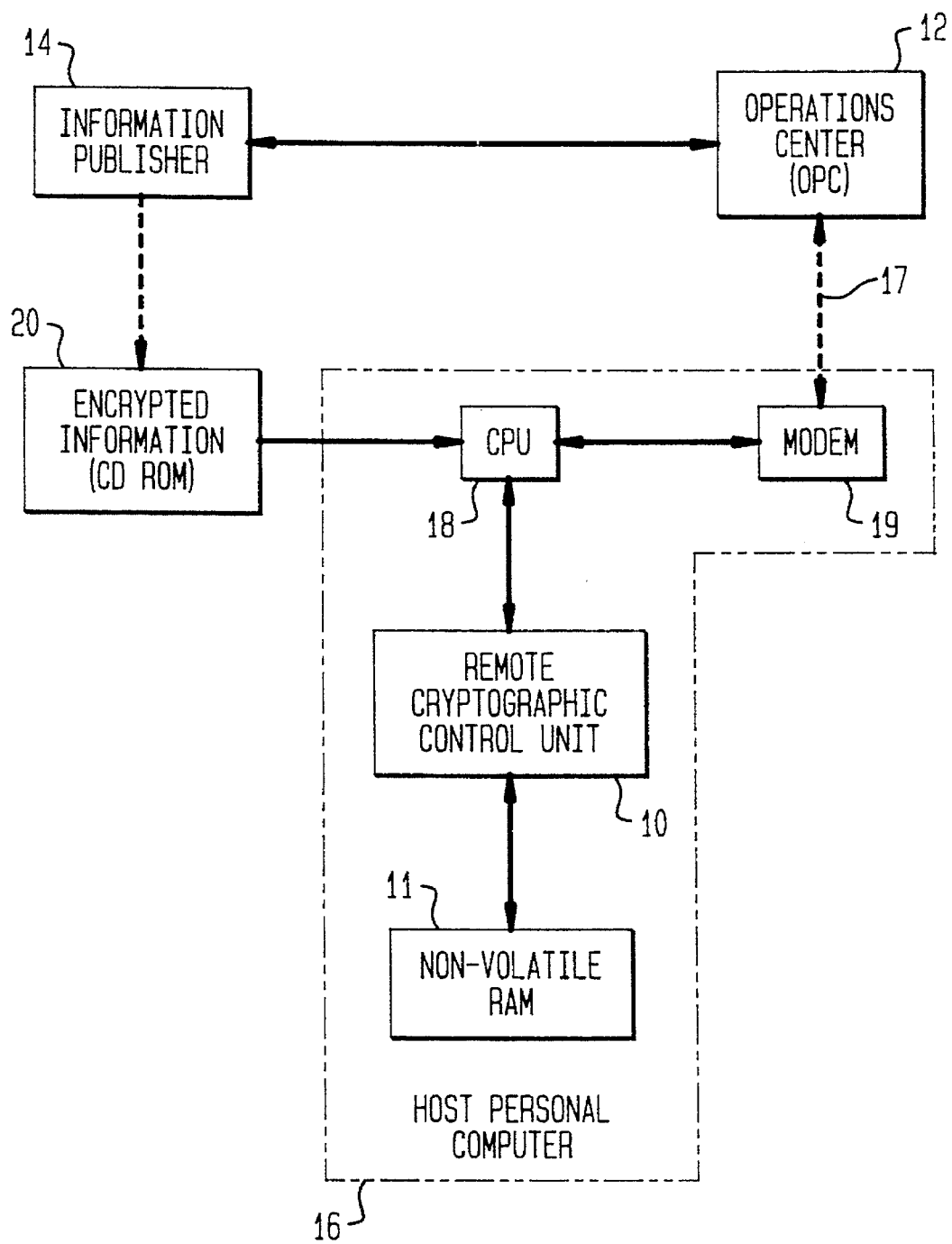
FIG. 1 is a block diagram of a system for reporting metered use of encrypted information embodying the present invention.

A system for metering and reporting access to an encrypted database is shown FIG. 1. The system includes a user terminal 16 and an OPC 12. The user terminal 16 is typically a host personal computer containing CPU 18, CD ROM reader 20, modem 19, and a remote cryptographic control unit (CRYPTO unit or information meter) 10 coupled to a non-volatile RAM storage memory 11. The user terminals 16 is linked to the OPC 12 through a telephone line modem connection 17.

In operation, information publisher 14 provides an encrypted database 20, which may be in CD ROM form, to the user terminal 16. The user inserts the encrypted CD ROM into the CD ROM player 20. Using search and retrieval software in the user's host personal computer, CPU 18 performs searches on the encrypted CD ROM database. In order to use the results of the search, the CPU requests that the CRYPTO unit 10 decrypt the desired data package from the CD ROM player 20.

If the CRYPTO unit has been previously provided with the necessary database keys (DB) for the particular encrypted CD ROM, and there is sufficient credit in the internal credit registers to make the purchase, then the CRYPTO unit 10 will decrypt the desired encrypted data. Thereafter, the cost of the decrypted data will be subtracted from the internal credit register. In addition, a record of the purchase and decryption of the data will be recorded in the non-volatile RAM 11 as a purchase log entry.

Eventually, in order to replenish credit and report data usage, the host PC 16 which contains the CRYPTO unit 10 will establish a telephone line connection to the OPC 12. Under control by the host PC, the CRYPTO unit 10 will call the OPC in the event that 1) the user initiates a command which causes the CRYPTO unit 10 to call the OPC 12, typically when the additional local credit is needed, 2) the amount of available memory space for recording the data usage records (purchase logs) in the non-volatile RAM 11 is low or exhausted, 3) a fixed time period has elapsed, 4) a remote transaction request is initiated by the user (if the database allows a remote transaction mode), to make a real time, on line purchase of a data package in the remote transaction mode.

In any event, the CRYPTO unit 10 commands the modem 19 to establish a telephone link 17 to the OPC 12. After a telephone link is established, the CRYPTO unit 10 identifies itself to the OPC 12 either in a secure header message, or a remote transaction request. Following transmission of a secure header message, the CRYPTO unit 10 can report usage, or send a secure request for either a consumer identification number (consumer ID) or for a credit or refund. In response, the OPC in a secure command forwards a consumer ID, a credit, or a refund to the CRYPTO unit 10, and any other commands it wishes to send at that time. The OPC 12 can respond to a remote transaction request by immediately approving the transaction.

Following the data exchanges, the CRYPTO unit 10 will either be allowed to make further purchases of encrypted information or denied further purchases. At periodic intervals, the OPC 12 reports on information use to information publisher 14.

Conventions Used

As used herein, the preferred encryption and decryption process is the Data Encryption Standard (DES). Briefly, for the electronic code book mode (ECB) of DES, an input block of 64 bits (8 bytes) is transformed into an output block of 64 bits in accordance with a 56 bit key. For decryption the reverse process is carried out, transforming 64 input bits to 64 output bits using the same 56 bit key. DES keys are typically represented in 64 bit, 8 byte quantities, with each byte having seven bits plus one parity bit, or 56 key bits plus 8 parity bits. As used herein, performing an encrypted keyload of a variable under a secret key means to encrypt (or decrypt) that variable (usually a key) under the secret key to generate another key. Encryption may be performed under a single key, or under multiple keys, such as a triple key set. Unless otherwise stated, encryption or decryption shall mean ECB mode of DES encryption or decryption under a triple key set. For triple key encryption, a key set of three keys are used to encrypt a variable using DES as follows: encrypt with key 1, decrypt with key 2, and encrypt with key 3. Triple key decryption is the reverse—decrypt with key 3, encrypt with key 2, and then decrypt with key 1.

As used herein, CBC shall mean a cipher block chaining mode with an initial vector, such as the cipher block chaining mode of the DES standard using an initial vector, IV. In going from a triple key load of a triple key from either a triple message key or a single message key, the convention will be as follows: output key 1 is derived from the application of key 1, key 2, key 3 encrypted, decrypted and encrypted respectively in that order (for encryption), output key 2 is derived from the application of key 3, key 2, key 1, encrypted, decrypted and encrypted respectively in that order (for encryption), and output key 3 is derived from the application of key 2, key 1, key 3, encrypted, decrypted and encrypted in that order (for encryption). Also, unless otherwise stated, the IV for a CBC DES encryption or decryption shall be zero.

Packet Communications Protocol

Figure 2:
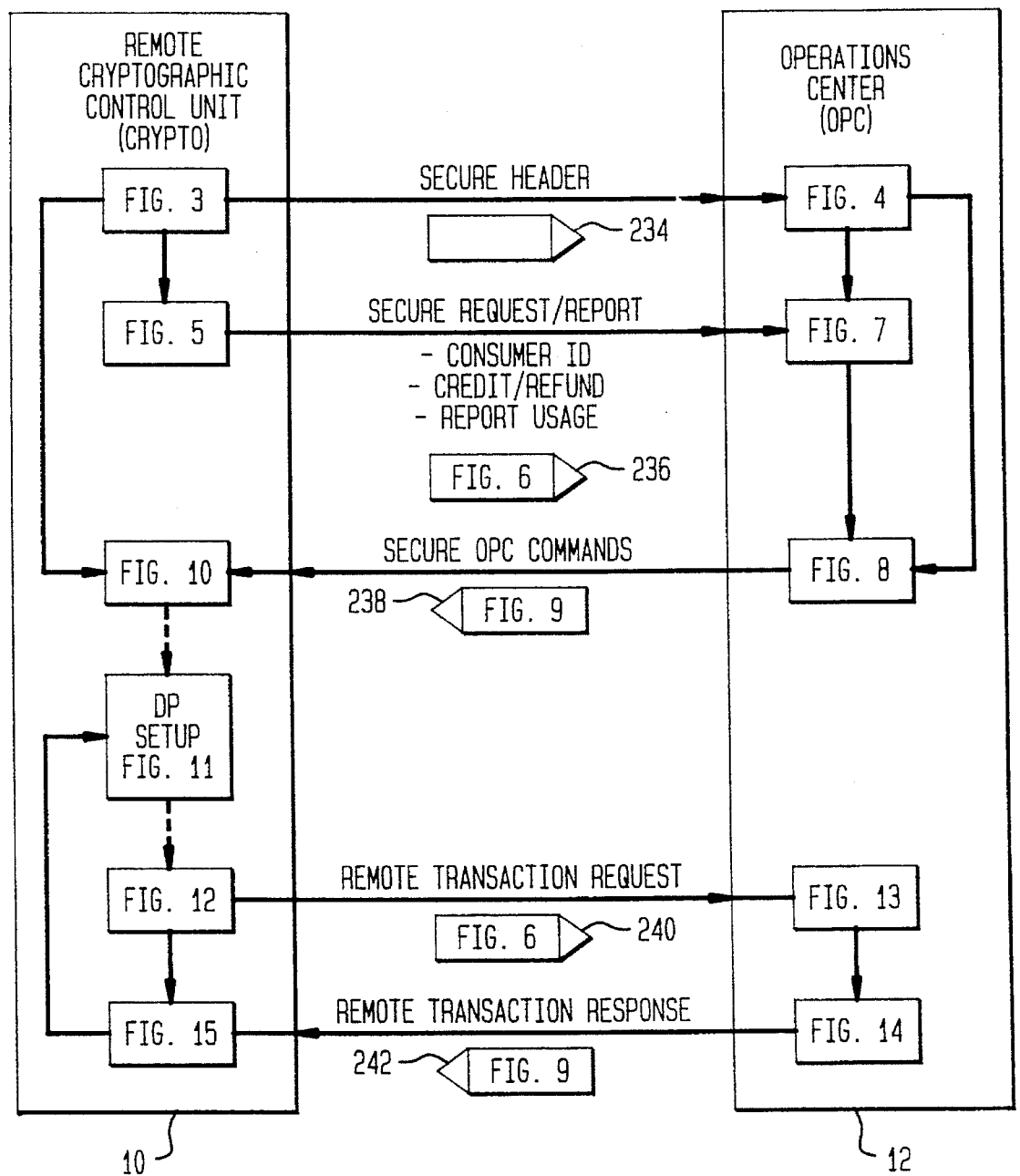
FIG. 2 is a block diagram illustrating the communication protocol between a remote CRYPTO unit and an OPC in accordance with the present invention.
Figure 3:
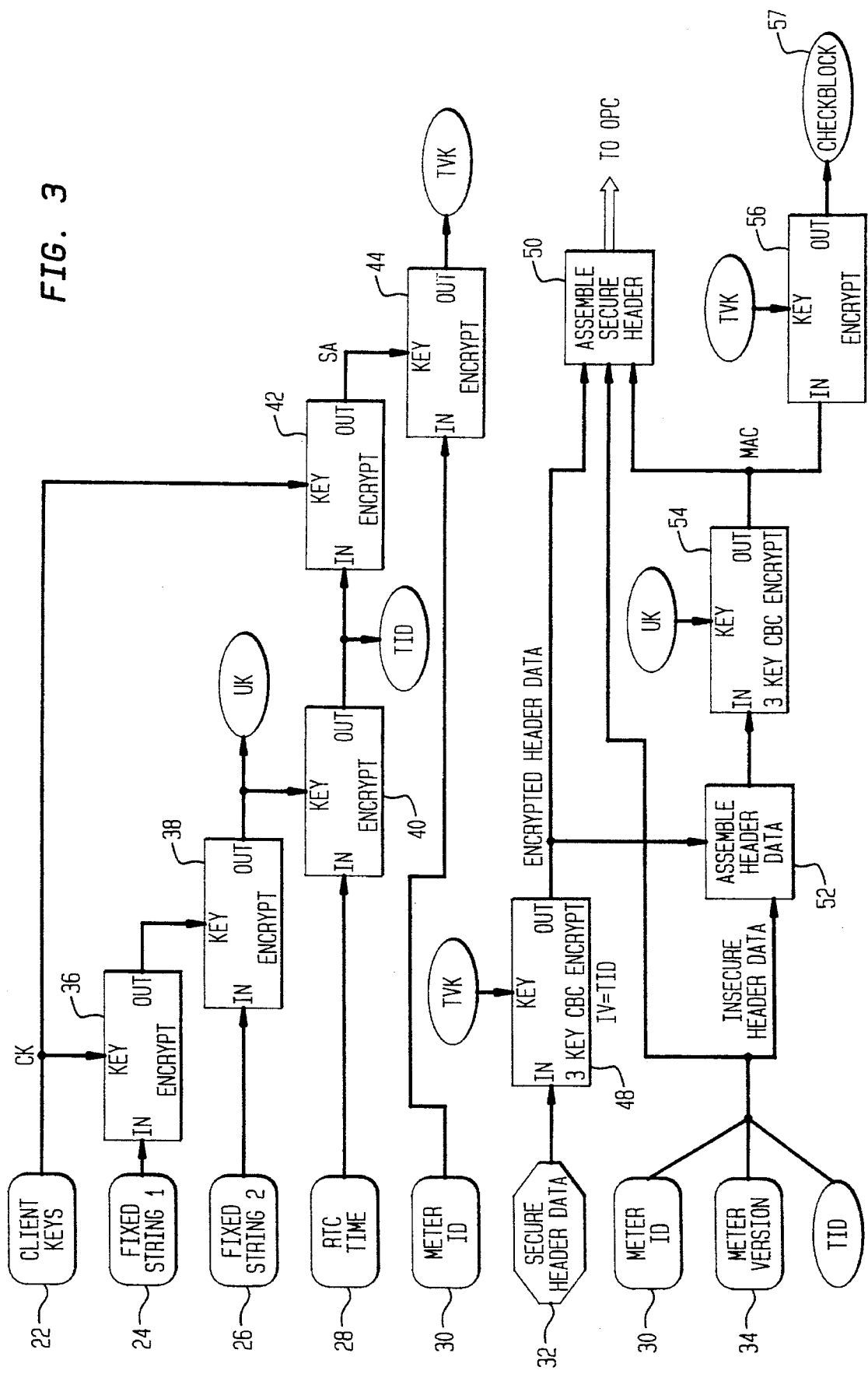
FIG. 3 is a flow chart diagram illustrating a method for generating a secure header in a remote CRYPTO unit in accordance with the present invention.

FIG. 2 illustrates the data exchange protocol between the OPC 12 and the CRYPTO unit 10. First, a secure header message 234 is sent from the CRYPTO unit 10 to OPC 12 which serves to identify and authenticate the CRYPTO unit 10. Following a secure header message 234, one or more secure requests or usage reports are sent in secure messages 236 from the CRYPTO unit 10 to the OPC 12. Responsive to the secure request and/or report, the OPC 12 responds with one or more secure OPC command messages 238 from the OPC 12 to the CRYPTO unit 10, such as downloading credit to the CRYPTO unit 10. The received credit is used by the CRYPTO unit 10 in a data package (DP setup) routine to decrypt data.

Alternatively, the user at CRYPTO unit 10 may request a real time, on line purchase of a data package in a remote transaction, if the database permits such remote transaction mode. For this purpose, CRYPTO unit 10 issues a remote transaction request message 240 to the OPC 12. In a remote transaction request, the OPC 12 decides whether or not to approve the purchase and responds with a secure remote transaction response message 242 back to the CRYPTO unit 10. All security functions such as authentication and the like, are compressed into a single CRYPTO unit request and OPC response. No credit register in the CRYPTO unit 10 is affected and no record of the purchase is recorded in the CRYPTO unit 10 non-volatile RAM. Following approval of the remote transaction request, the DP setup routine provides a key which is used to decrypt desired data. FIGS. 3 through 14 illustrate the foregoing message protocol in greater detail.

Prepare Secure Header Message—Rypto Unit

The CRYPTO unit stores a secret key called a client key set CK in a battery backed volatile random access memory (RAM) 22. CK is unique to a given CRYPTO unit. In addition, the CRYPTO unit stores two fixed constants: a first fixed string 24 and a second fixed string 26. A meter ID 30 identifies the individual meter which the CRYPTO unit represents. A measure of current time is provided by a real time clock (RTC) 28.

Several communication keys, including a unit key (UK), a transaction identification (TID), and a transaction verification key (TVK) are generated as follows. Fixed string 24 is encrypted under CK in encryptor 36, the result of which is used as a key to encrypt fixed string 26 in encryptor 38, forming UK. Real time from the real time clock 28 is encrypted in encryptor 40 under UK to form TID. TID is encrypted under CK in encryptor 42 to provide an intermediate key SA which in turn is used as a key to encrypt the meter identification 30 (ID) in encryptor 44 to form a transaction verification key (TVK). Unless otherwise specified, encryption of a variable under a key set means a triple key DES block ECB encryption.

To form a secure header packet, secure header data 32 is triple key CBC encrypted in encryptor 48 under the TVK using an IV equal to the TID. Insecure header data consisting of the Meter ID (identification number for the meter) 30, the Meter Version 34 (like a revision number for the integrated circuit implementation), and the TID are sent in the clear. A MAC (message authentication code or manipulation detection code) is calculated by assembling the insecure header data with encrypted header data, and triple key CBC encrypting the combination 52 in encryptor 54 under the UK to form a MAC. Unless otherwise specified, CBC encryption uses triple key and an IV equal to zero.

The insecure header data, the encrypted header data from encryptor 48, and the calculated MAC are assembled into a packet forming a secure header message and transmitted 50 to the OPC. At the CRYPTO unit, the calculated secure header MAC is further encrypted in encryptor 56 under the TVK to form a checkblock 57 which is stored locally.

Receive Secure Header Message—Opc

Figure 4:
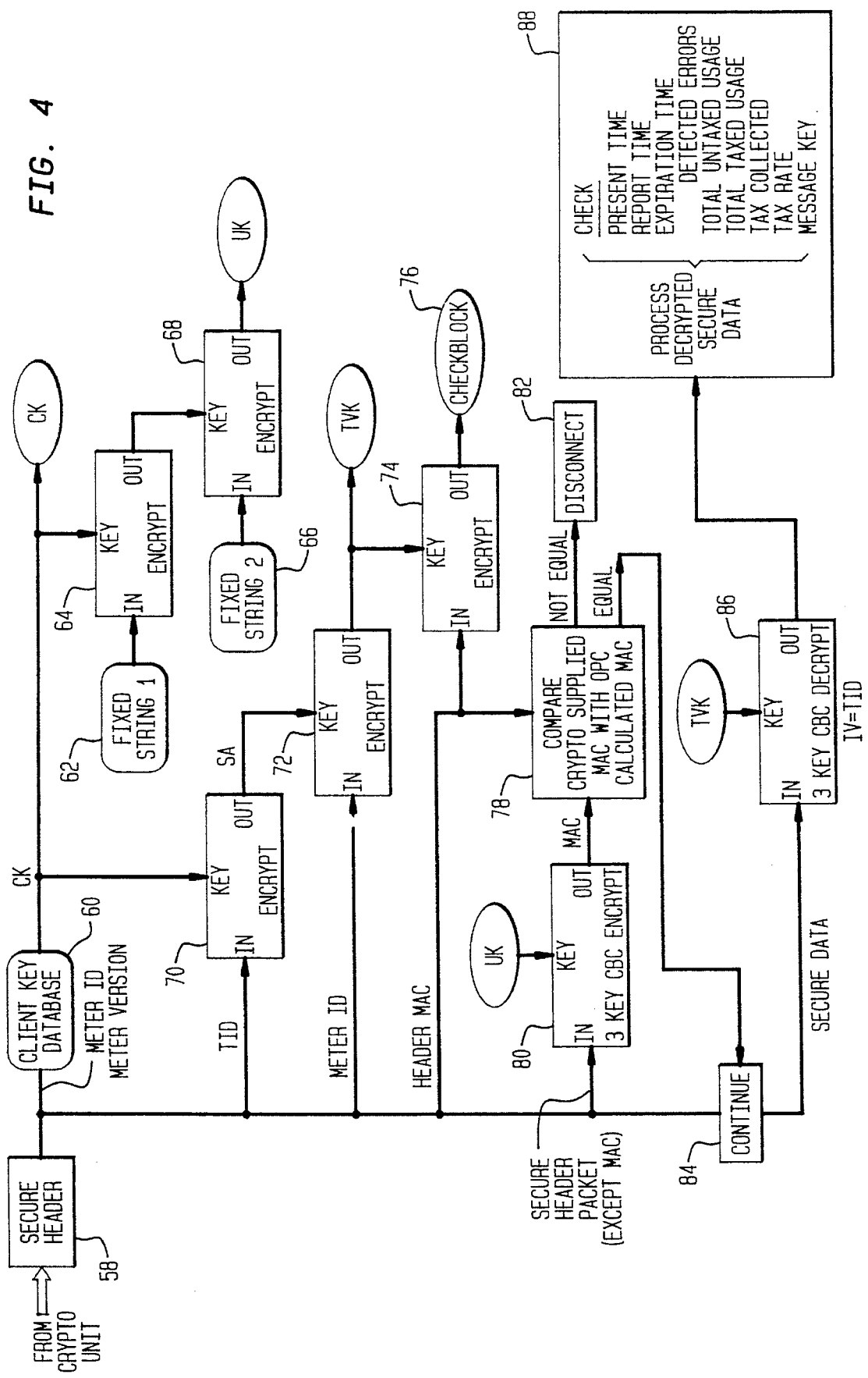
FIG. 4 is a flow chart diagram illustrating a method and apparatus for receiving a secure header in an operations center in accordance with the present invention.

The secure header message 58 is received and processed as shown in FIG. 4. Client key database 60 contains the secret keys for all of the users of the system. Using the insecure header data for the Meter ID and the Meter Version, the client key CK is looked up in the client key database 60. UK is replicated by encrypting the stored first fixed string 62 under CK in encryptor 64 and using the result as the key to encrypt the second fixed string 66 in encryptor 68. Received insecure header data TID is encrypted under CK in encryptor 70 and the result SA used as the key to encrypt the meter ID in encryptor 72 to recreate TVK. The secure header MAC is encrypted in encryptor 74 under TVK to form a locally regenerated version of the checkblock 76 which is stored in the OPC.

To recreate the secure header MAC at the OPC, the received secure header packet (except for the MAC) is encrypted in CBC encryptor 80 under UK as the key with IV equal to zero. The calculated MAC at the output of encryptor 80 is compared to the received secure header MAC in comparator 78. If the MAC received from the CRYPTO unit is not equal to the MAC calculated by the OPC, then the telephone connection is disconnected at step 82. However, if the MAC comparison 78 indicates equality, authenticity of the transmitting CRYPTO unit is presumed, and the process of receiving secure data is continued at step 84.

Encrypted secure data is decrypted in CBC decryptor 86 using an IV equal to TID. The data is processed at step 88. In particular, the OPC checks the present time, the report time and the expiration time for the CRYPTO unit. Also processed is the total untaxed usage, the total taxed usage, the tax collected, the tax rate and the message key used for each meter. Received values are checked against the records for the particular CRYPTO unit. Any detected errors are noted as irregularities warranting manual review of the consumer account.

Prepare Secure Request/Report—Crypto Unit

Figure 5:
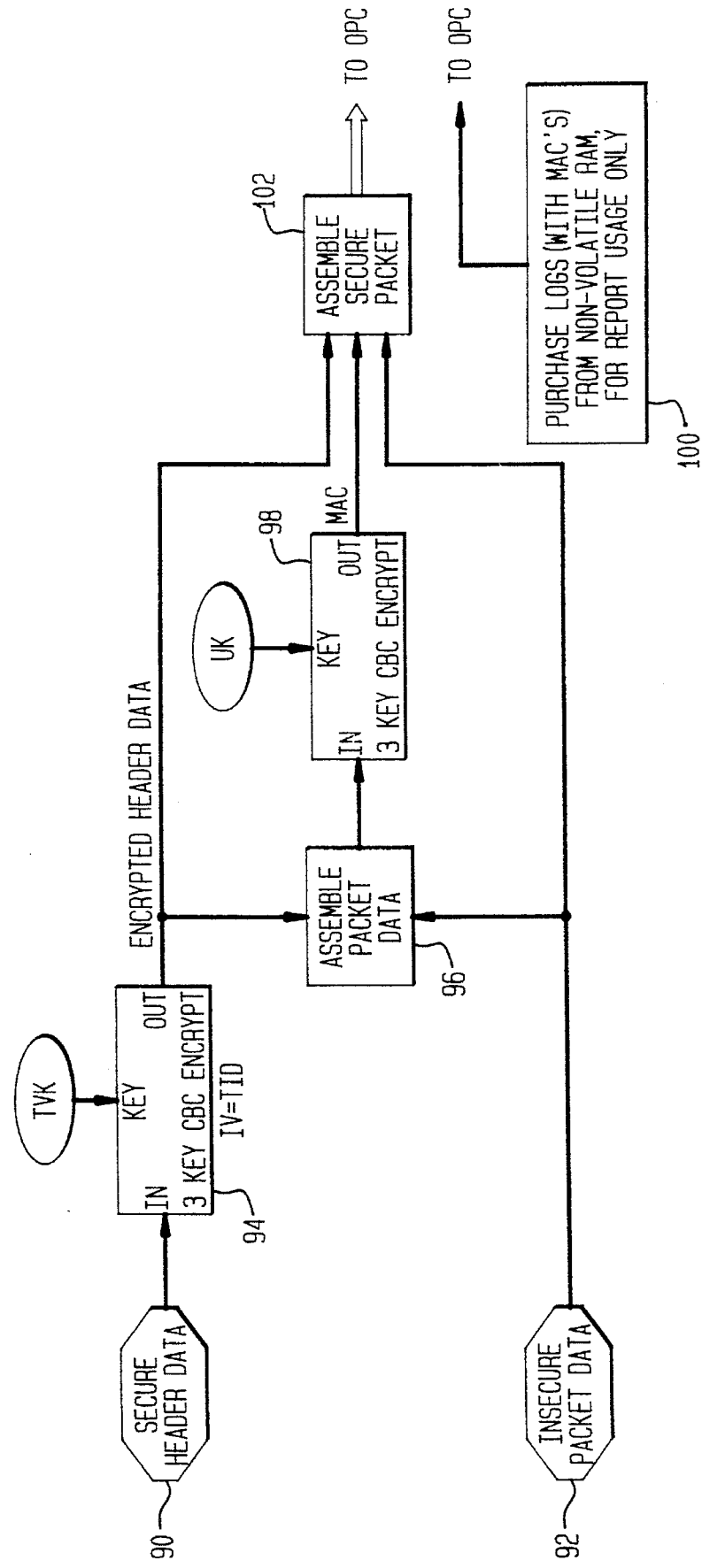
FIG. 5 is a flow chart diagram illustrating a method and apparatus for generating a secure request message and a secure report usage message in a remote CRYPTO unit in accordance with the present invention.

There are three types of messages as shown in FIG. 5, generated by the CRYPTO unit to the OPC: REPORT USAGE, REQUEST CREDIT/REFUND and REQUEST CONSUMER ID.

Report Usage

In REPORT USAGE, the totals and summaries of the purchase logs 100 previously entered in the non-volatile RAM 11, each with an appended MAC and control signals, are forwarded to the OPC in the secure packets of a REPORT USAGE message. Purchase logs are transmitted without any encryption. The purchase log entries forming the data usage report provide an audit trail to cross check total credit purchases.

Request a Consumer Id

Initially, a CRYPTO unit has no particular identity other than its client key CK and its meter ID. However, before any transactions can be conducted, an individual identity is needed from the OPC, which identity links the user to a particular CRYPTO unit, and is used in future communications. Therefore, before any transactions are conducted, the CRYPTO unit requests and receives an assigned consumer ID which is stored locally in the CRYPTO unit.

Request for Credit or Refund

If a consumer ID has been previously assigned, then a secure request for credit or a secure request for a refund can be sent from the CRYPTO unit 10. In a SECURE REQUEST FOR CREDIT, the CRYPTO unit requests a financial transaction to deliver credit, typically from the user's credit card account. In a SECURE REQUEST FOR REFUND, the CRYPTO unit requests a financial transaction to refund previously delivered credit, typically to the user's credit card account.

Secure Request Packet Generation

In the event of any of the above secure requests, secure packet data 90 is CBC encrypted in encryptor 94 under TVK using TID as the IV. The resulting encrypted packet data is assembled 96 with insecure packet data 92 and encrypted in CBC encryptor 98 under UK, the output of which forms the MAC for the secure request packet. The encrypted packet data, and the insecure packet data and the generated MAC is assembled into a secure request message and forwarded 102 to the OPC. As indicated above, the purchase logs 100 are not combined with any of the secure requests but are sent as a separate packet stream to the OPC, only if the report usage command is executed.

Crypto Packet Format

Figure 6:
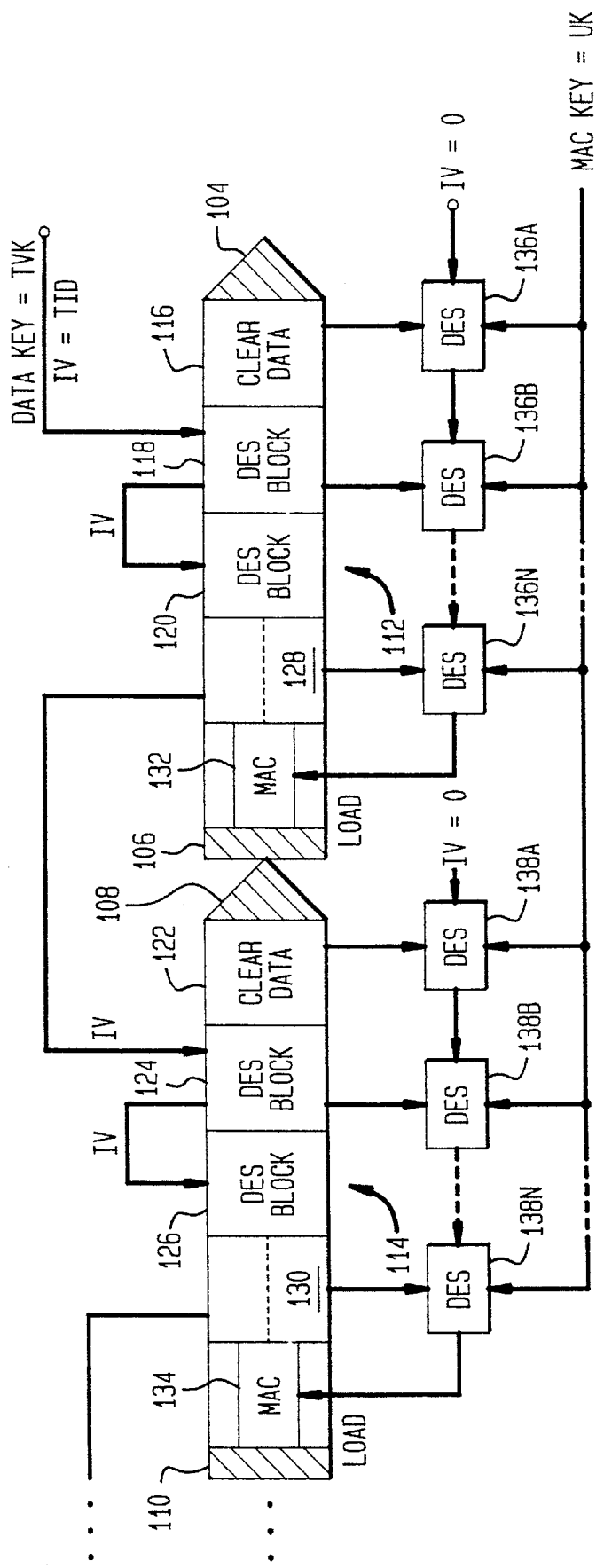
FIG. 6 is a diagram partially in block form illustrating the packet format of a secure message generated in a remote CRYPTO unit in accordance with the present invention.

FIG. 6 illustrates the format of the secure packets which are sent from the CRYPTO unit to the OPC. Two consecutive packets 112 and 114 forming a secure CRYPTO request are shown. The first packet 112 is preceded by header bits 104 and followed by trailer bits 106 which are part of the higher order session layer level of the protocol. Similarly, following packet 114 is framed by header bits 108 and trailer bits 110 which are part of the higher order session layer level of the protocol.

Each packet 112 and 114 contains a portion of clear data 116 and 122 respectively which contains the insecure packet data. By way of example, each of clear data portions 116 and 122 contain 3 blocks of 8 bytes each, or 24 bytes total. Following the clear data portions 116 and 122, are encrypted data DES blocks 118, 120 and 128 (for packet 112) and DES blocks 124, 126 and 130 (for packet 114) respectively.

A first encryption key TVK is used to encrypt the packet data, and a second encryption key UK is used to generate the packet MAC. Both packet data and MAC generation use triple key DES in CBC mode. The MAC encryption key is UK, with the IV equal to zero for each packet. The data encryption key is TVK with the IV equal to the previous encrypted DES block, except for the first DES block 118 of the first packet 112, in which case the IV is TID.

For the first DES block of each successive packet, the IV is the last DES block of the previous packet. That is, the IV for encrypting the first DES block 118 of packet 112 is TID. DES block 118 is then used as the IV for encrypting the next DES block 120, and so on to the last DES block of packet 112. The last DES block of 128 of packet 112 is used as the IV to encrypt first DES block 124 of the following packet 114. Within packet 114, DES block 124 is used as the IV to encrypt DES block 126, and so on, through all of the DES blocks of packet 114. The last DES block of packet 114 is used as the IV to encrypt the DES blocks of successive packets of the secure CRYPTO request.

The respective MACs 132 and 134 for packets 112 and 114 are loaded as the last block of each packet. The key for computing the MAC is the unit key UK. The IV is set equal to zero for each MAC calculation. The MAC is computed over both the clear data block 116 and the encrypted data DES blocks 118, 120, 128. For CBC encryption mode, the output of DES encryptor 136A is the IV for DES encryptor 136B, and so on through to the last DES encryptor 136N. The final output of the last CBC DES encryptor 136N is loaded into packet 112 as the MAC 132 for packet 112.

The MAC for the subsequent packet 114 is generated by setting the IV equal to zero at DES encryptor 138A and performing successive DES CBC encryptions over both the clear data 122 and the encrypted data DES blocks 124, 126, 130. For CBC encryption mode, the output of DES encryptor 138A is the IV for DES encryptor 138B, and so on through to the last DES encryptor 138N. The final output of the last CBC DES encryptor 138N is loaded into packet 114 as the MAC 134 for packet 114.

In an alternate embodiment, the IV for DES encryptor 138A may be set equal to the MAC 132 of the previous packet 112. In such manner, both the IV for data encryption and the IV for MAC calculation is passed from one packet to the next.

Received Secure Message—Opc

Figure 7:
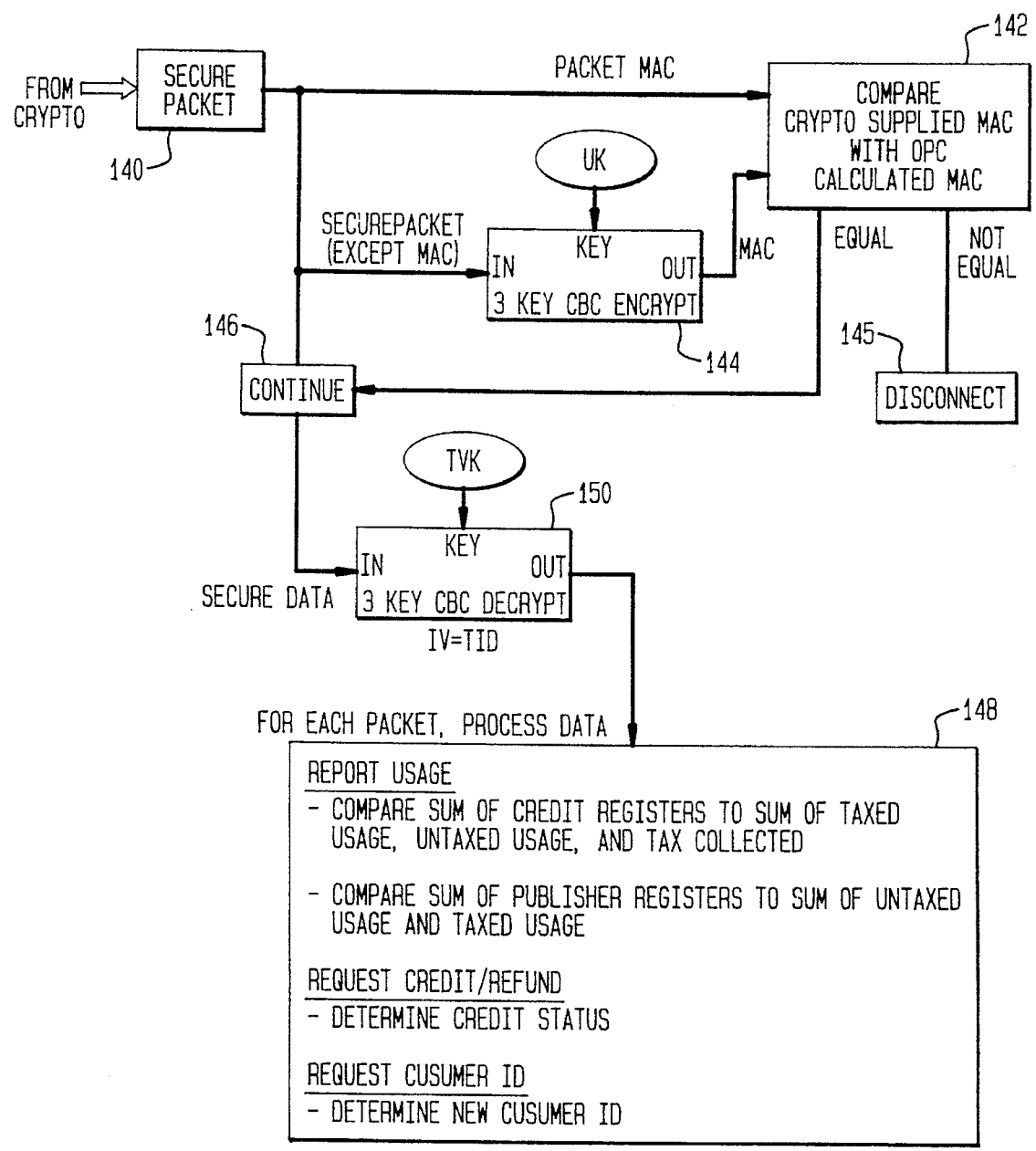
FIG. 7 is a flow chart diagram illustrating a method and apparatus for receiving a secure request message and a secure report message in an operation center.

The secure request or the report usage message 140 is received at the OPC and processed as in FIG. 7. To calculate the packet MAC, the secure message, except for the received MAC, is CBC encrypted in encryptor 144 under the UK. The resulting OPC calculated MAC is compared with the received packet MAC at step 142. If the supplied MAC is not equal to the calculated MAC, telephone connection is disconnected at step 145. However, if the supplied MAC is equal to the calculated MAC then secure data processing continues at step 146 to processing the received data step 148. Received encrypted secure data is CBC decrypted in decryptor 150 under TVK with IV equal to TID.

If the received message consisted of a report usage, then the sum of the credit registers is compared to the sum of the taxed usage, untaxed usage, and tax collected to reconcile prior purchases. Also, the sum of the publisher registers is compared to the sum of the untaxed usage and taxed usage records to reconcile prior use. The mode where purchases are made off line against a stored credit, and later reconciled after a usage report to the OPC is termed the audit trail mode.xx If the request was for a credit or refund, the OPC determines the credit status of the subscriber client before responding with a secure OPC command. Similarly, if the request was for a consumer ID, the status of prior assigned consumer ID, if any, is determined before responding with a secure OPC command for a new consumer ID.

Prepare Secure Opc Commands—Opc

Figure 8:
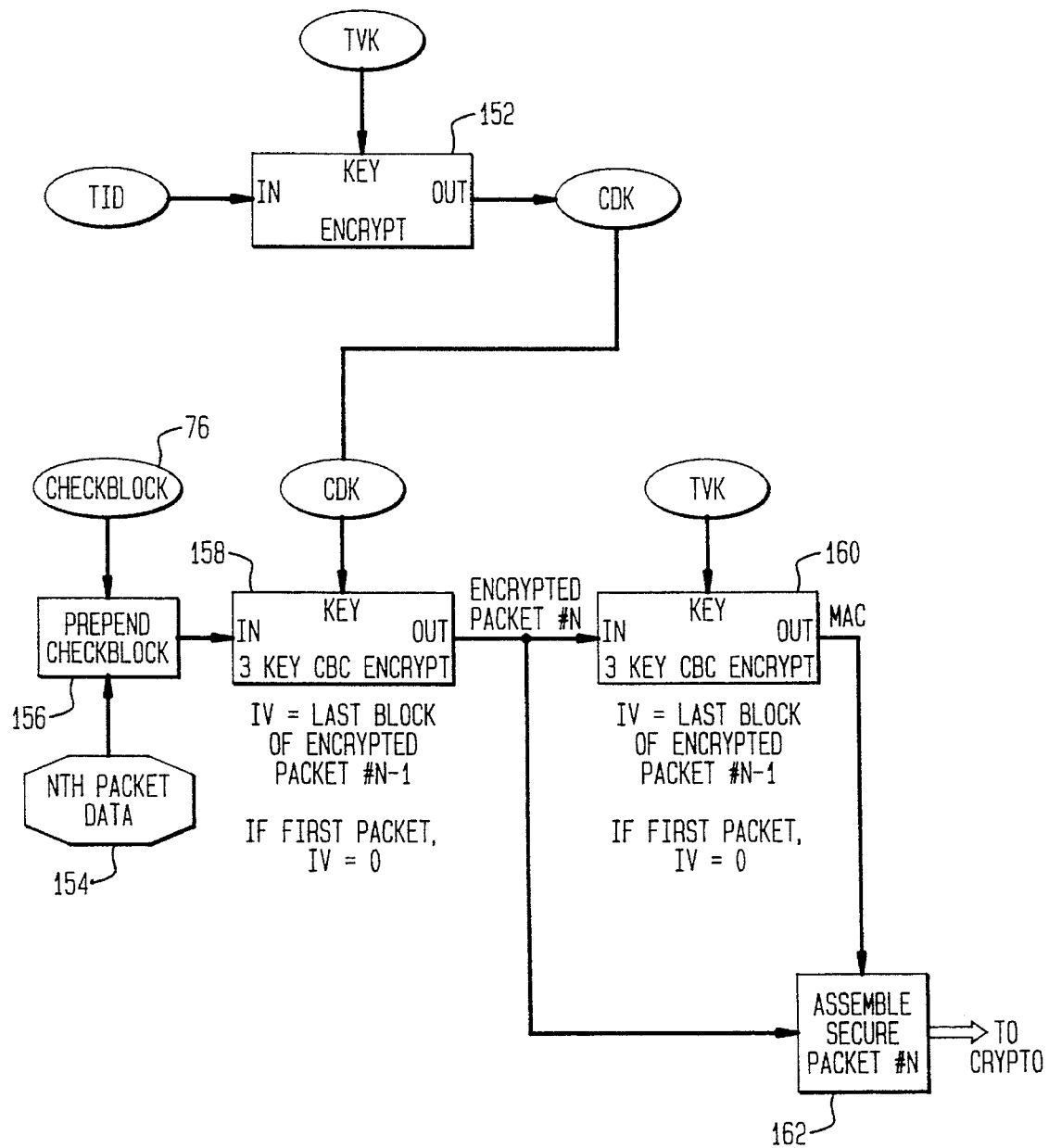
FIG. 8 is a flow chart diagram illustrating a method and apparatus for preparing secure commands in an operation center in accordance with the present invention.

Secure OPC commands are encrypted as shown in FIG. 8. A new key, CDK, is generated by encrypting TID in encryptor 152 under TVK. The secure OPC command is generated by prepending checkblock 76 to the packet data 154 (Nth packet) at step 156. The resulting data is encrypted in CBC encryptor 158 to produce encrypted data for the present packet N. The IV for data encryption is equal to zero for the first packet, and equal to the last block of the preceding encrypted packet (N-1) for all successive packets. A MAC is generated over the encrypted packet in encryptor 160. In computing the MAC for the first packet, the IV is set equal to zero. For each successive packet, the IV for the MAC calculation is set equal to the last block of the encrypted packet preceding the present packet. The encrypted packet data and the computed MAC are assembled 162 into a secure OPC command message to the CRYPTO unit.

Using the previous encrypted data as the IV for the MAC links the MAC to all the previous packets. Using the previous encrypted data as the IV for the data decryption also links the checkblock and the data to all the previous packets. That is, the packets from the OPC must be passed to the CRYPTO unit in the same order that they were prepared. Modification of the order of packets, removal of packets, modification of packet contents, and substitution of packets will be detected by the CRYPTO unit as a MAC comparison failure.

Opc Packet Format

Figure 9:
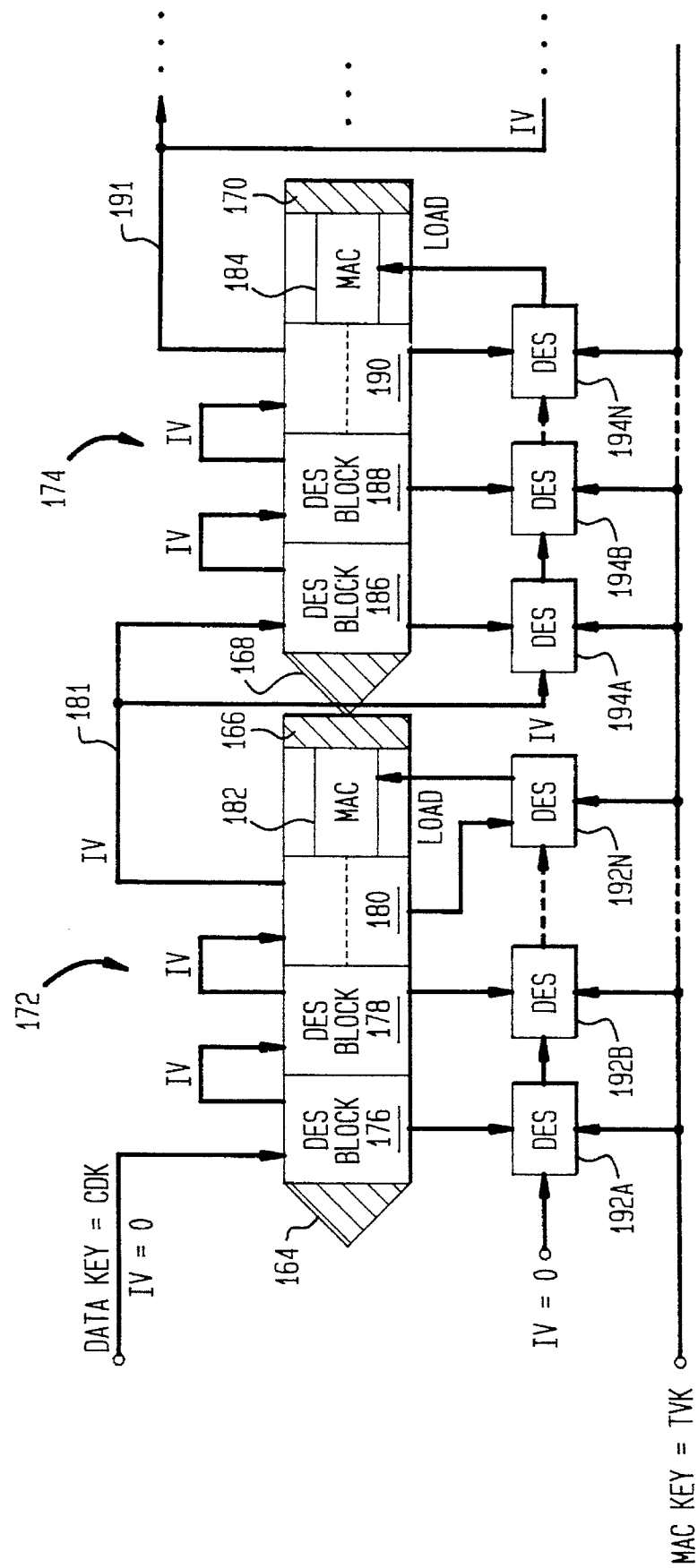
FIG. 9 is a diagram partially in block form illustrating the packet format for a secure message in an operation center in accordance with the present invention.

FIG. 9 illustrates the format of the secure packets which are sent from the OPC to the CRYPTO unit. Two consecutive packets 172 and 174 forming a secure OPC message are shown. The first packet 172 is preceded by header bits 164 and followed by trailer bits 166 which are part of the higher order session layer level of the protocol. Similarly, the following packet 174 is framed by header bits 168 and trailer bits 170 which are part of the higher order session layer level of the protocol. Each packet 172 and 174 contains encrypted DES blocks 176, 178 and 180 (for packet 172) and encrypted DES blocks 186, 188 and 190 (for packet 174) respectively.

A first encryption key CDK is used to encrypt the packet data, and a second encryption key TVK is used to generate the packet MAC. Both packet data and MAC generation use triple key DES in CBC mode. The IV for the first block 176 of the first packet 172 for both packet data and MAC generation is zero. For successive packets, the IV for MAC generation is cross linked to the encrypted data. The IV for data encryption is the previous encrypted DES block. For each successive packet, the IV for the first DES block is the last DES block of the previous packet.

Specifically, the IV for encrypting DES block 176 of packet 172 is zero. DES block 176 is then used as the IV for encrypting the next DES block 178, and so on to the end of the packet 172. The last DES block of 180 of packet 172 is used as the IV to encrypt DES block 186 of the following packet 174. Within the next packet 174, DES block 186 is used as the IV to encrypt DES block 188, and so on to the end of the packet 174. The last DES block 190 of packet 174 is used as the IV, 191, to encrypt the DES blocks of the successive packet of the secure OPC message.

As indicated, the key for computing the MAC is TVK. For the first packet 172, the IV is zero. For each successive packet, the IV is the encrypted data of the previous packet. For example, the IV, 181, for computing the MAC for packet 174 is the encrypted DES block 180 of the previous packet 172. Similarly, the IV, 191, for the following packet is the encrypted DES block 190 of the previous packet 174. In such manner, the resulting MAC is not independent for each packet, but instead is dependent on all the previous packets. The chaining of initial vectors for the MAC calculation for one packet to the MAC calculation for next packet provides protection that the packets are in the proper order, and have not been reordered by an attacker.

In further detail, the MAC 182 is computed over the encrypted data DES blocks 176, 178, 180, with the IV equal to zero. The output of DES encryptor 192A is the IV for DES encryptor 192B, and so on through to the last DES calculation 192N. The final output of the last CBC DES calculation 192N is loaded into packet 172 as the MAC 182 for packet 172. The MAC for the subsequent packet 174 is generated in a similar manner except that the IV for the first encryptor 194A is equal to the previous encrypted DES block 180. The output of DES encryptor 194A is the IV for DES encryptor 194B, and so on through to the last DES calculation 194N. The final output of the last DES calculation 194N is loaded into packet 174 as the MAC 184 for packet 174.

Receive Secure Opc Commands—Crypto Unit

Figure 10:
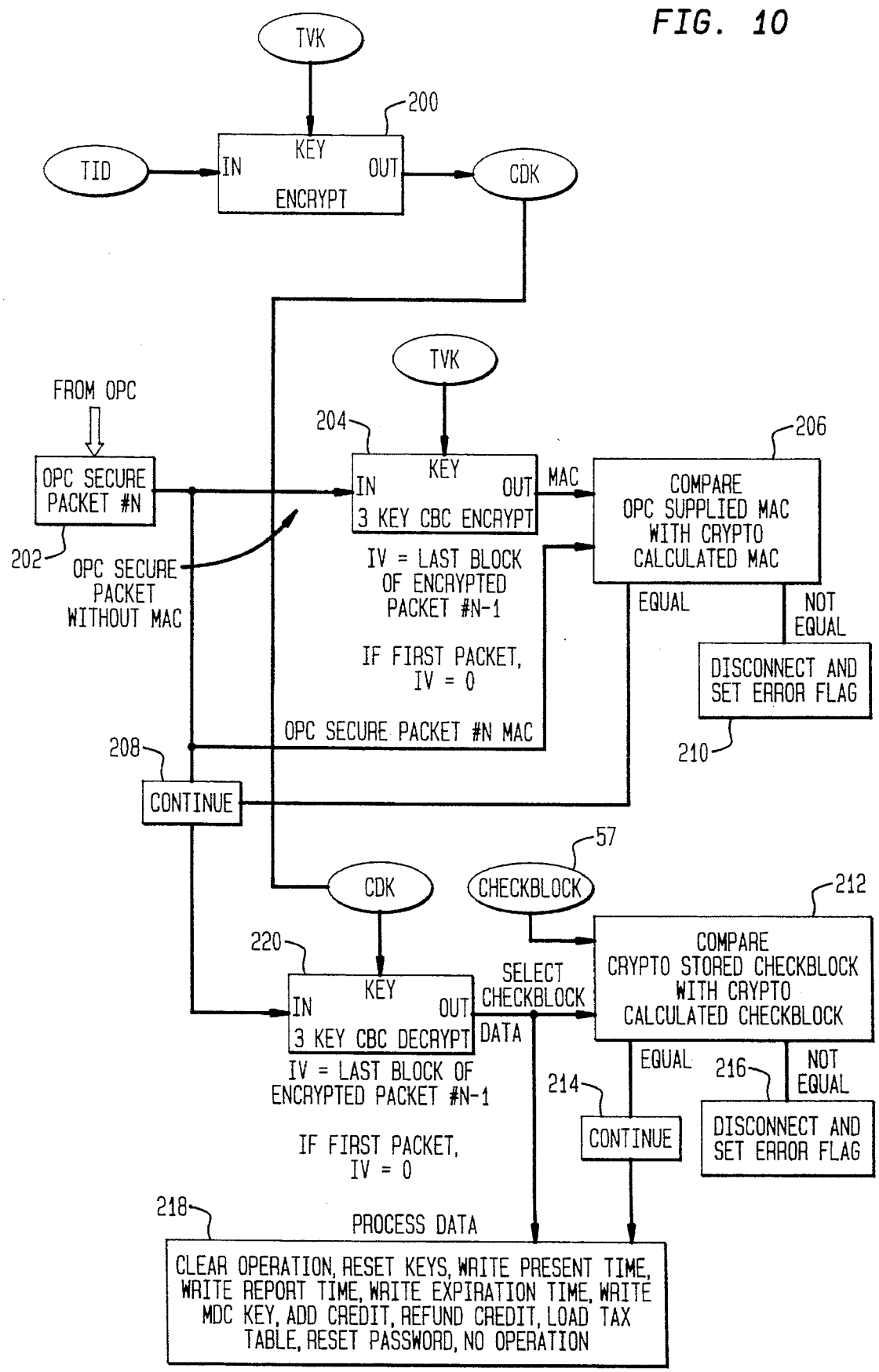
FIG. 10 is a flow chart diagram illustrating a method and apparatus for receiving secure commands in a remote CRYPTO unit in accordance with the present invention.

The secure OPC command message packets 202 are received at the CRYPTO unit as shown in FIG. 10. CDK is recreated by encrypting TID in encryptor 200 under TVK.

To check the secure OPC message MAC at the CRYPTO unit, the secure packet (except for the MAC) is encrypted in CBC encryptor 204 under TVK using an IV equal to zero for the first packet, and equal to the last DES block of the previous packet for successive packets. The calculated MAC at the output of encryptor 204 is compared to the received secure OPC message MAC in comparator 206. If the MAC received from the OPC is not equal to the MAC calculated by the CRYPTO unit, then the telephone connection is disconnected at step 210 and an error flag is set. Error flags are reported to the OPC on the following secure communication from the CRYPTO unit. However, if the MAC comparison 206 indicates equality, processing of received secure commands is continued at step 208.

The prepended checkblock and the rest of the secure OPC message is recovered by encrypting in CBC encryptor 220 under CDK with an IV equal to zero for the first packet, and equal to the last DES block of the previous packet for successive packets. The recovered checkblock selected at the output of encryptor 220 is compared to the previously stored checkblock in comparator 212. If the checkblock received from the OPC is not equal to the checkblock calculated by the CRYPTO unit, then the telephone connection is disconnected at step 216 and an error flag is set. However, if the checkblock comparison 212 indicates equality, processing of received secure commands is continued at step 214.

The successful round trip return of the checkblock indicates to the CRYPTO unit that the OPC knows the client key CK and is responding to the secure header message last sent by the CRYPTO unit.

Commands received in the secure OPC command are processed at step 218. Typical commands are a clear operation, reset keys, write present time, write report time, write expiration time, write MDC key, write consumer ID, add credit, refund credit, load tax table, and reset password. The command to write report time sets a future time for the CRYPTO unit to report to the OPC.

The command to write expiration time sets a future time after which the CRYPTO unit will not function, unless the expiration time is reset to a later expiration time during a subsequent secure communication exchange with the OPC. A programmable expiration time is a precaution against the CRYPTO unit being used to avoid payment for decrypted data. The programmable expiration time is also used to ensure the CRYPTO unit communicates with the OPC even if the CRYPTO unit is not used to make any purchases, a feature which allows the OPC to know which meters are operational for maintenance and support purposes, and forces a connection on an occasional basis as a security precaution. If the CRYPTO unit does not report to the OPC by the expiration time, no further data will be decrypted regardless of any other factor, such as available credit or database keys.

DP Setup—Crypto Unit

The data package setup routine (DP setup, shown in figure 11A), uses the CRYPTO unit client key 22, locally stored credit and locally stored keys (or keys obtained in a remote transaction mode), to prepare a key (DP or SU) for data decryption and to decrypt purchased data (260 or 266).

Figure 11A:
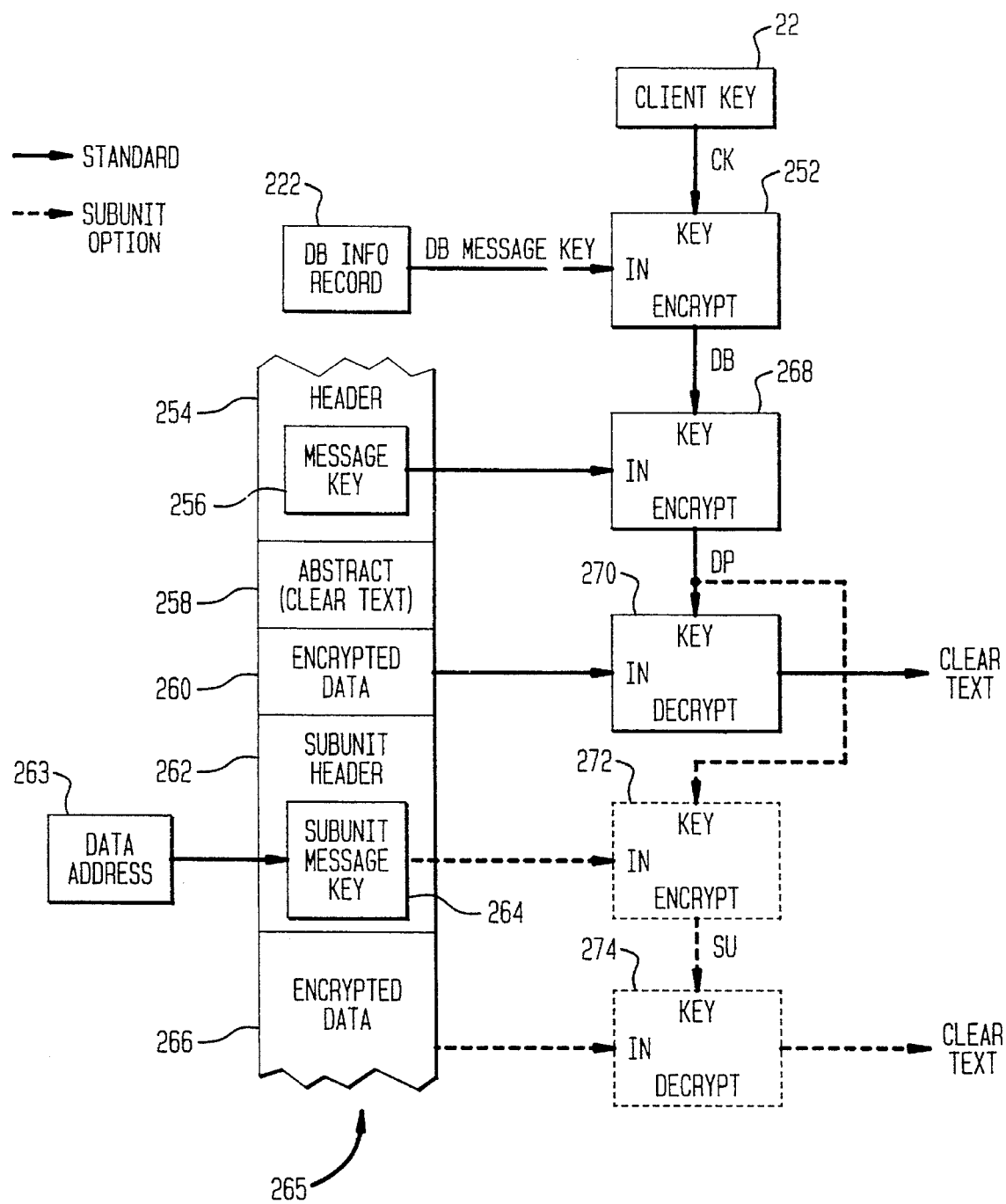
FIG. 11A is a diagram partially in block form illustrating the data format and decryption of an encrypted database.

The data package 265 format within the encrypted CD ROM database is shown in FIG. 11A. The encrypted data package 265 includes a header 254 which incorporates a data package message key 256, and optionally a subunit header 262 which incorporates a subunit message key 264. Each data package 265 includes a clear text abstract 258 and encrypted data 260 or 266 which have been encrypted using a data package (DP) key or a subunit (SU) key respectively. A clear text abstract 258 facilitates database searches prior to making a decision to purchase and decrypt the data to which the abstract relates. The header 254 and the subunit header 262 also contain a cost factor of the following respective encrypted data 260, 266.

Prior to the decryption of the data package within a database, a database information record (DB info record) 222 is sent to the CRYPTO unit, typically upon the first use of a database, in a separate communication session. The DB info record 222 is sent in the clear, except for the DB message key which is encrypted under the client key CK. The DB info record further contains a price factor (352 in FIG. 16) for the database to which it relates. The actual purchase cost is the price factor from the DB info record 222 multiplied by the cost factor from the header 254 or 262.

The DP setup routine operates as follows: The DB message key 256 from the DB info record 222 is encrypted using CK as the key in encryptor 252 to produce the DB keys, which is used as a key to encrypt the message keys 256 in encryptor 268. The resulting clear DP key at the output of encryptor 268 is used in normal mode as the key to decrypt data in decryptor 270, resulting in clear text.

If the subunit option is used, then the DP key is further used as a key to encrypt the subunit message key 264 in encryptor 272 to provide a subunit key SU. The resulting clear subunit key SU is then used as the key to decrypt the encrypted subunit data 266 in decryptor 274 resulting in clear text.

In the normal mode, the DP key (as the input to decryptor 270) is a single key. However, if the subunit option is used, the DP key (as the input to decryptor 272) is a triple key and the subunit key SU is a single key. A single key process for final data decryption in both the normal mode and subunit option mode is desirable because a single key decryption process runs faster than a triple key decryption process, making the single key process preferable unless the extra security of a triple key is needed. 0cl Subunit Option Typically a separate encryption code is used for each separate data package and a separate charge is made for each decrypted data package. The subunit option is useful in cases where there are many small data packages and it is desired to encrypt each data package with a separate key.

For example, assume that the data package 265 is a mailing list. Each mailing address record is too small to justify a separate header containing an encryption/decryption key, yet it is desired to encrypt each separately and charge for each separately when each data record is decrypted from the mailing list. In such case, the encryption keys might use more memory than the data itself, resulting in inefficient data storage. Therefore, the subunit message key may be shortened to 40 bits for example. A subunit key, shorter than the data package key is a compromise between the competing values of data storage efficiency and cryptographic security. In the embodiment shown, the subunit message key is implied from the data storage structure.

The subunit message key 264 is formed by using the data address 263 within the data package 265 as a key. The data address 263 is masked to match the length of the desired subunit message key 264. By using the address of the desired encrypted data as the encrypted subunit message key (to be encrypted under the DP key), no memory space is needed to store encrypted subunit message keys.

Figure 11B:
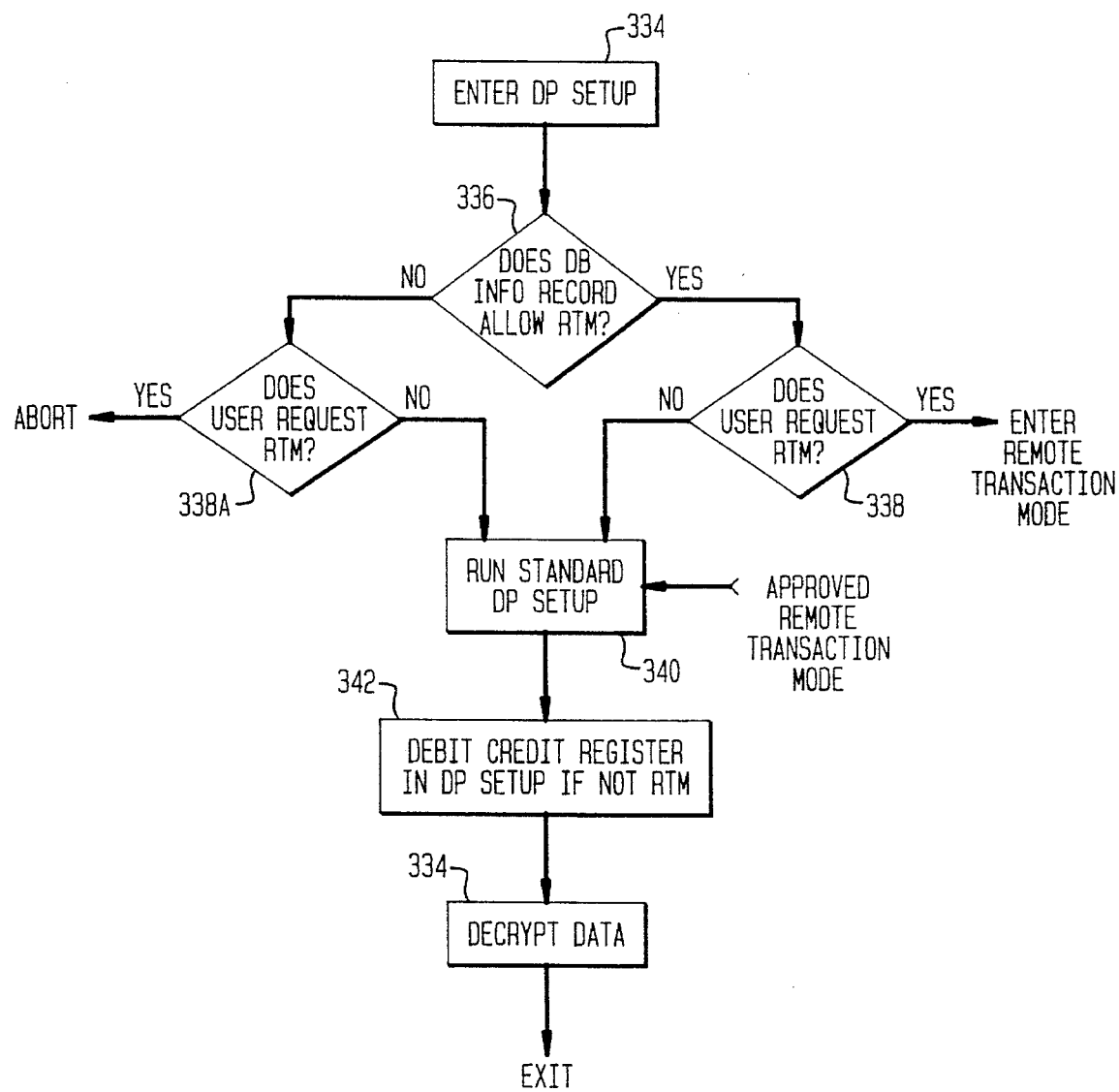
FIG. 11B is a flow chart diagram illustrating the use of remote transaction request during a data purchase in the metered decryption of an encrypted database.

A flow chart of the logic for using the DP setup routine in remote transaction mode (RTM) is shown in FIG. 11B. Upon entering DP setup at step 334, the CRYPTO checks the DB info record at step 336 to determine whether the database provider allows RTM. If the DB info record does not allow RTM, and the user requests RTM, the program aborts at step 338A. If the user does not request RTM at step 338A, the standard DP setup routine is run at step 340. If the user does not request RTM at step 338, the standard DP setup routine is run at step 340. If the user does request RTM at step 338, RTM is entered. After returning from an approved remote transaction in RTM, the standard DP setup routine is entered at step 340. A description of the messages exchanged in RTM is described in conjunction with FIGS. 12, 13, 14 and 15, below.

After DP setup 340, the cost of the data package is debited from a credit register and a purchase log entry is made in the non-volatile RAM at step 342, if the data package was purchased using local credit. If the data package purchase price was paid in a remote transaction, the credit register is not changed at step 342, and a purchase log entry is not made in the non-volatile RAM. Thereafter, the desired data package is decrypted at step 344.

FIG. 12 shows the remote transaction request generation at the CRYPTO unit. Keys UK and TID are generated as before. In addition two temporary keys SC, and SB are generated. In particular, SC is generated by encrypting the meter ID 30 in encryptor 276 under intermediate key SA. The purchase log 278 from the non-volatile RAM memory is CBC encrypted under UK in encryptor 280 to provide a purchase log MAC 281. The credit register is encrypted under temporary key SC in encryptor 284 to provide an encrypted credit register value 285.

The meter version, meter ID, TID, purchase log with generated purchase log MAC, and the encrypted credit register are assembled 287 into a packet with its own MAC and sent as a remote transaction request 288 to the OPC. A MAC for the remote transaction request message is generated by CBC encryption of the message data in encryptor 286 under the temporary key SC. Temporary key SB is generated by encrypting the remote transaction request MAC in encryptor 290 under the temporary key SC.

Figure 13:
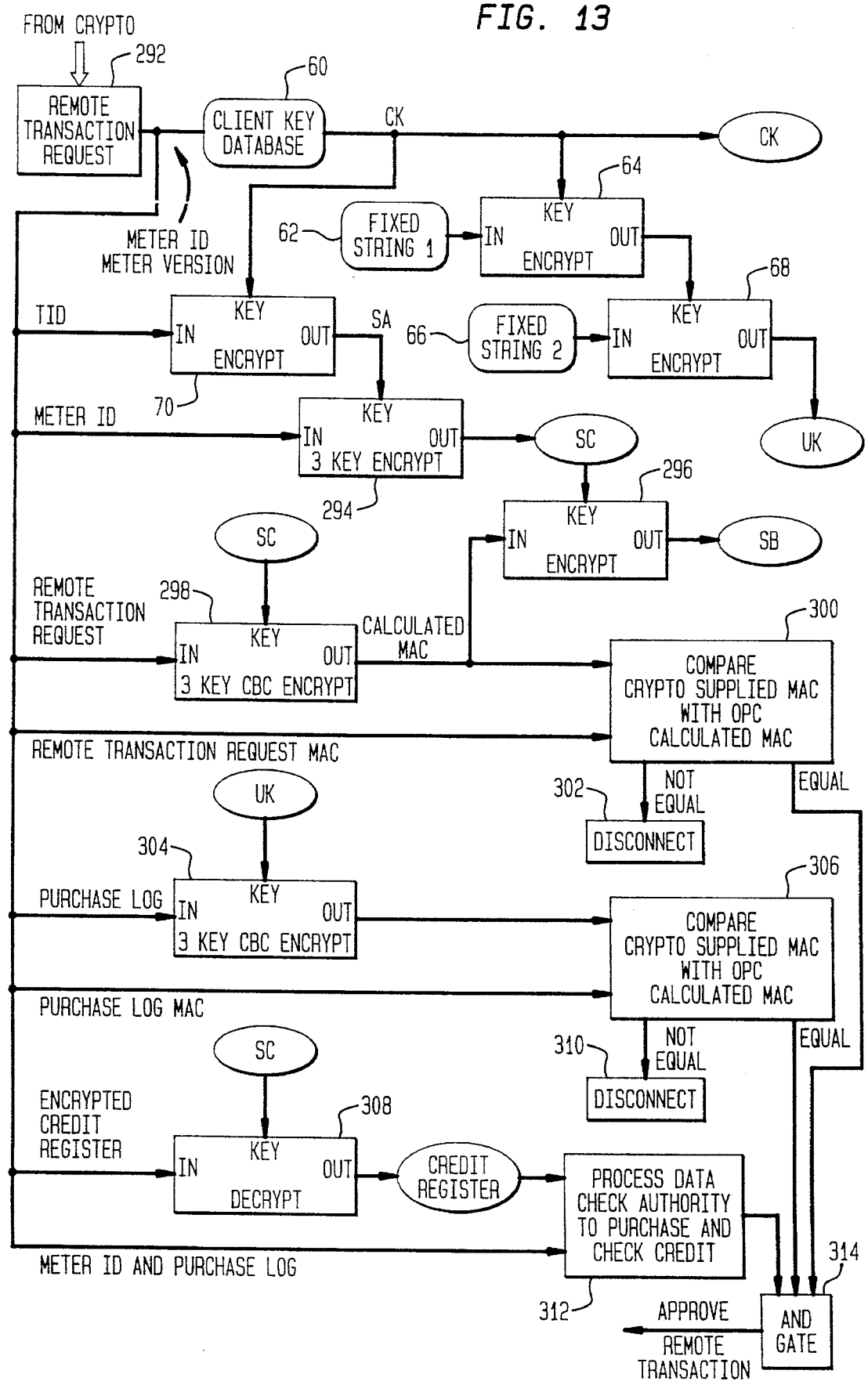
FIG. 13 is a flow chart diagram illustrating a method and apparatus for receiving a remote transaction request in an operation center embodying the present invention.

At the OPC, the remote transaction request 292 is received and processed as shown in FIG. 13. As in the processing of a secure header message, CK, UK and SA are generated at the OPC. Temporary key SA is used to encrypt the meter ID in CBC encryptor 294 to form temporary key SC. The OPC calculates the MAC for the remote transaction message by CBC encryption in encryptor 298 under SC. The calculated MAC is encrypted in encryptor 296 to form temporary key SB.

The remote transaction MAC is calculated in CBC encryptor 298 under SC and compared to the remote transaction MAC from the CRYPTO unit in comparator 300. If the remote transaction MAC calculated at the OPC is not equal to the CRYPTO unit supplied remote transaction MAC, the session is terminated at step 302. Also, the purchase log MAC is calculated in CBC encryptor 304 under UK and compared to the purchase log MAC from the CRYPTO unit in comparator 306. If the purchase log MAC calculated at the OPC is not equal to the CRYPTO unit supplied purchase log MAC, the session is terminated at step 310.

The encrypted credit register contents are decrypted in decryptor 308 under SC. The credit register contents in conjunction with the meter ID and purchase log are processed 312 to approve the current purchase. The credit of the subscriber is checked to determine credit capacity, and if adequate, the authority to make the present data purchase is granted. If MAC comparisons 300 and 306 indicate equality, and the authority to make the present purchase is granted 312 then the remote transaction is approved at the output of AND gate function 314.

Figure 14:
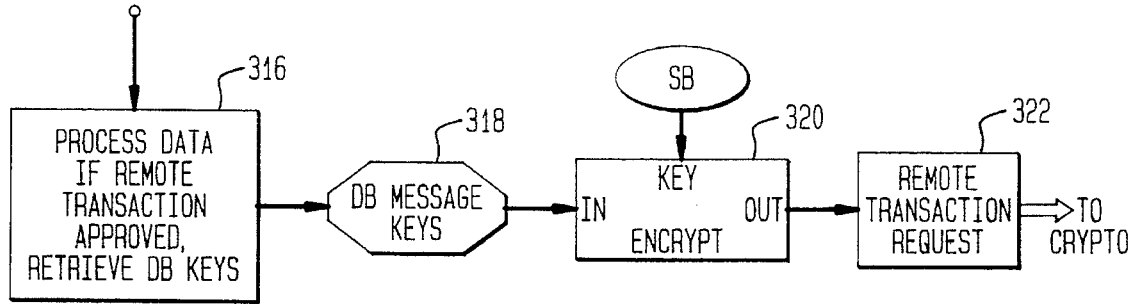
FIG. 14 is a flow chart diagram illustrating a method and apparatus for preparing a remote transaction response at an operations center in accordance with the present invention.

The approval of the remote transaction is processed 316 and communicated back to the CRYPTO unit as in FIG. 14. Also the DB keys are retrieved from the DB info record and are encrypted in encryptor 320. The DB keys 318 are encrypted in encryptor 320 under SB as the encryption key, and the enciphered DB keys are transmitted to the CRYPTO unit in a remote transaction response 322.

Figure 15:
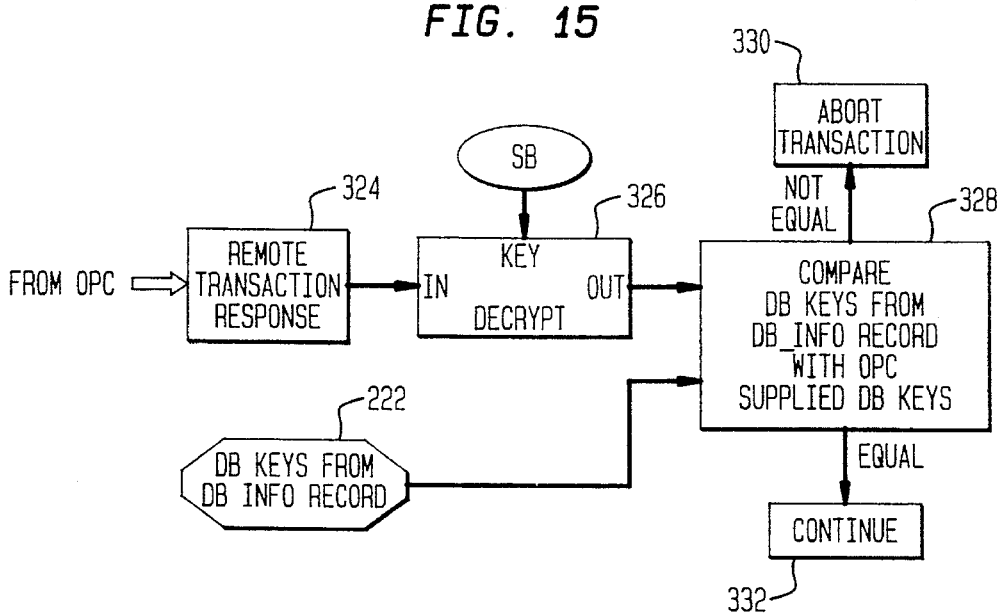
FIG. 15 is a flow chart diagram illustrating a method and apparatus for receiving a remote transaction response in a remote CRYPTO unit.

The CRYPTO unit receives and processes the remote transaction response as in FIG. 15. The remote transaction response is received 324 and decrypted in decryptor 326 under SB as the decryption key. The DB message keys from the OPC remote transaction response are compared 328 to the DB message keys from the DB info record 222, and if not equal, the transaction is aborted at step 330.

If the comparison 328 indicates that the DB keys from the CRYPTO unit DB info record are equal to the DB keys from the OPC supplied remote transaction response, the DP setup routine continues at step 332. In such manner, a real time on line purchase of the data package is effected which permits continuation of the user's data session.

DB Info Record

Figure 16:
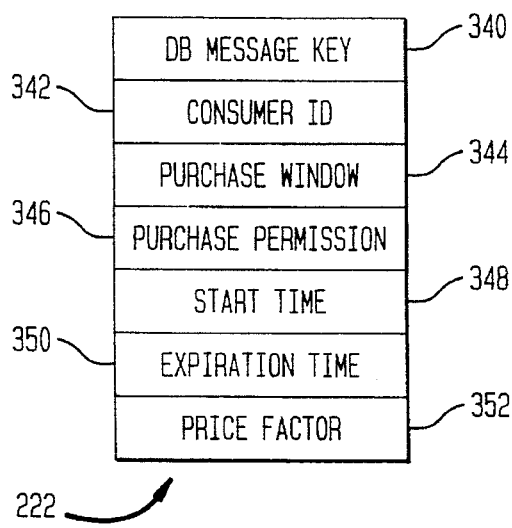
FIG. 16 is diagram of various data fields of the DB info record represented in memory in accordance with the present invention.

As indicated above, the DB info record is sent to the user in a separate communication session. The DB info record, illustrated in FIG. 16, is stored in memory in the user terminal. The DB info record contains the DB message key 340 which is the DB key encrypted under the client key CK. The other data fields of the DB info record, such as the price factor 352 discussed above, are in the clear. The DB info record also contains additional fields useful in controlling access to encrypted databases.

In particular, the consumer ID 342 from the DB info record is compared to the locally stored consumer ID previously received via the secure message (238 in FIG. 2) in response to a secure request (236 in FIG. 2) as described above. If the consumer ID from both sources do not match, the CRYPTO unit will not use the stored DB info record 222. The foregoing feature permits special pricing to be offered to specific users, identified by their consumer ID.

Additionally, the DB info record 222 contains a purchase window field 344. The purchase window is the amount of time that the user may decode the purchased data. The purchase window can be set short, so as to effectively allow one time data decryption, up to a span of days, months or even to unlimited ability to decrypt the purchased data.

A purchase permission field 346 defines whether the user may make a purchase in audit trail mode (off line), or the remote transaction mode (on line) or both. In certain cases where the information publisher desires to control distribution, typically for a high value product, only remote transaction mode may be permitted.

The DB info record also includes a start time field 348, and an expiration time field 350. The DB info record 222 is valid only between the start time 348 and the expiration time field 350. That is, before the start time 348 and after the expiration time 350 the CRYPTO unit will not use the DB info record 222. The foregoing feature permits more than one DB info record for the same database. In such manner, special pricing may be offered for specific periods, identified by the period defined between the start time 348 and the expiration time 350.

The foregoing describes a comprehensive metered data and communication system including remote transaction capability and using an encrypted data structure with flexible system control.

What is claimed is:

1. In a cryptographic system for metered use of data from an encrypted database, said encrypted database having a database cryptographic key associated therewith for enabling said metered use of said encrypted database, said encrypted database being divided into separate encrypted portions individually available for separate purchase, a method for encrypting said database comprising:

dividing said data into a plurality of data packages;

individually encrypting each of said plurality of data packages under a respective plurality of data package cryptographic keys to form a plurality of encrypted data packages;

encrypting each of said plurality of data package cryptographic keys under said database cryptographic key to form a plurality of encrypted data package cryptographic keys, each of said plurality of encrypted data package cryptographic keys associated with each said plurality of data packages respectively;

forming a plurality of encrypted data package headers containing said data package cryptographic key encrypted under said database cryptographic key, each of said plurality of encrypted data package headers associated with each of said plurality of data packages respectively;

storing said plurality of encrypted data packages in said encrypted database; and storing each of said plurality encrypted data package headers containing said respective plurality of data package cryptographic keys in said database and associated with each of said respective plurality of data packages.

2. A method in accordance with claim 1, further comprising:

dividing at least one of said plurality of data packages into a plurality of subunit data packages, said one data package having one data package cryptographic key associated therewith;

individually encrypting each of said plurality of subunit data packages under a respective plurality of subunit data package cryptographic keys to form a plurality of encrypted subunit data packages;

encrypting each of said plurality of subunit data package cryptographic keys under said one data package cryptographic key to form a plurality of encrypted subunit data package cryptographic keys, each of said plurality of encrypted subunit data package cryptographic keys associated with each said plurality of subunit data packages respectively;

forming a plurality of encrypted subunit data package headers containing a definition of said subunit data package cryptographic key encrypted under said one data package cryptographic key, each of said plurality of encrypted subunit data package headers associated with each of said plurality of subunit data packages respectively;

storing said plurality of encrypted subunit data packages in said encrypted database; and storing each of said plurality encrypted subunit data package headers containing said respective plurality of subunit data package cryptographic keys in said database and associated with each of said respective plurality of data packages.

3. A method in accordance with claim 2, wherein each subunit data package cryptographic key encrypted under said one data package cryptographic key is stored in said subunit header.

4. A method in accordance with claim 2, wherein said subunit data package cryptographic key encrypted under said one data package cryptographic key is substantially equal to the respective address of said subunit data package in said encrypted database.

5. In a cryptographic system for metered use of data from an encrypted database, said encrypted database having a database cryptographic key associated therewith for enabling said metered use of said encrypted database, said encrypted database being divided into separate encrypted portions individually available for separate purchase, an apparatus for encrypting said database comprising:

means for dividing said data into a plurality of data packages;

means for individually encrypting each of said plurality of data packages under a respective plurality of data package cryptographic keys to form a plurality of encrypted data packages;

means for encrypting each of said plurality of data package cryptographic keys under said database cryptographic key to form a plurality of encrypted data package cryptographic keys, each of said plurality of encrypted data package cryptographic keys associated with each said plurality of data packages respectively;

means for forming a plurality of encrypted data package headers containing said data package cryptographic key encrypted under said database cryptographic key, each of said plurality of encrypted data package headers associated with each of said plurality of data packages respectively;

means for storing said plurality of encrypted data packages in said encrypted database; and means for storing each of said plurality encrypted data package headers containing said respective plurality of data package cryptographic keys in said database and associated with each of said respective plurality of data packages.

6. An apparatus in accordance with claim 5, further comprising:

means for dividing at least one of said plurality of data packages into a plurality of subunit data packages, said one data package having one data package cryptographic key associated therewith;

means for individually encrypting each of said plurality of subunit data packages under a respective plurality of subunit data package cryptographic keys to form a plurality of encrypted subunit data packages;

means for encrypting each of said plurality of subunit data package cryptographic keys under said one data package cryptographic key to form a plurality of encrypted subunit data package cryptographic keys, each of said plurality of encrypted subunit data package cryptographic keys associated with each said plurality of subunit data packages respectively;

means for forming a plurality of encrypted subunit data package headers containing a definition of said subunit data package cryptographic key encrypted under said one data package cryptographic key, each of said plurality of encrypted subunit data package headers associated with each of said plurality of subunit data packages respectively;

means for storing said plurality of encrypted subunit data packages in said encrypted database; and means for storing each of said plurality encrypted subunit data package headers containing said respective plurality of subunit data package cryptographic keys in said database and associated with each of said respective plurality of data packages.

7. An apparatus in accordance with claim 6, wherein each subunit data package cryptographic key encrypted under said one data package cryptographic key is stored in said subunit header.

8. An apparatus in accordance with claim 6, wherein said subunit data package cryptographic key encrypted under said one data package cryptographic key is substantially equal to the respective address of said subunit data package in said encrypted database.

* * * * *